(12) United States Patent
Suzuki et al.

(10) Patent No.: US 9,871,933 B2
(45) Date of Patent: Jan. 16, 2018

(54) INFORMATION PROCESSING APPARATUS AND IMAGE PROCESSING SYSTEM FOR GENERATING IMAGE DATA FOR A PREVIEW IMAGE BY USING PRINT DATA DESCRIBED IN PAGE DESCRIPTION LANGUAGE

(71) Applicants: Hiroshi Suzuki, Tokyo (JP); Takao Suzuki, Tokyo (JP)

(72) Inventors: Hiroshi Suzuki, Tokyo (JP); Takao Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/370,061

(22) Filed: Dec. 6, 2016

(65) Prior Publication Data
US 2017/0180569 A1   Jun. 22, 2017

(30) Foreign Application Priority Data

Dec. 17, 2015  (JP) .................................. 2015-246101

(51) Int. Cl.
| | | |
|---|---|---|
| H04N 1/00 | (2006.01) | |
| G06F 3/12 | (2006.01) | |
| G06K 15/02 | (2006.01) | |

(52) U.S. Cl.
CPC ......... *H04N 1/0044* (2013.01); *G06F 3/1208* (2013.01); *G06F 3/1256* (2013.01); *G06F 3/1294* (2013.01); *G06K 15/1813* (2013.01); *G06K 15/1822* (2013.01); *H04N 1/00204* (2013.01); *H04N 1/00344* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,058,037 A | * | 10/1991 | Kageyama ............. | G06K 15/00 358/1.17 |
| 2002/0026453 A1 | * | 2/2002 | Mori ...................... | G06K 15/02 |

(Continued)

FOREIGN PATENT DOCUMENTS

| | | |
|---|---|---|
| JP | 2008-283470 | 11/2008 |
| JP | 2010-238086 | 10/2010 |

*Primary Examiner* — Ming Hon
(74) *Attorney, Agent, or Firm* — IPUSA, PLLC

(57) ABSTRACT

An information processing apparatus is for generating image data by using drawing information for drawing an image. The information processing apparatus includes a print data acquirer configured to acquire print data including the drawing information from outside; a request acceptor configured to accept a request to display the image data of any page in the print data; a reader configured to read specific drawing information of pages in the print data up to a page before the any page accepted by the request acceptor, from a drawing information storage storing the specific drawing information, which is the drawing information that may be applied to the image data of pages after a page in which the drawing information is described, among the drawing information included in the print data; and a generator configured to generate the image data of the any page by applying the read specific drawing information.

10 Claims, 9 Drawing Sheets

(56) References Cited

U.S. PATENT DOCUMENTS

| | | | |
|---|---|---|---|
| 2003/0090717 A1* | 5/2003 | Yoshida | G06F 17/30011 358/1.15 |
| 2003/0133141 A1* | 7/2003 | Toda | G06F 3/1211 358/1.13 |
| 2003/0137691 A1* | 7/2003 | Tanaka | G06F 3/1204 358/1.15 |
| 2005/0078974 A1* | 4/2005 | Uchida | G03G 21/043 399/81 |
| 2006/0066899 A1* | 3/2006 | Yoshida | G06F 3/1256 358/1.15 |
| 2007/0127064 A1* | 6/2007 | Kuroshima | G06F 3/1204 358/1.15 |
| 2008/0278770 A1* | 11/2008 | Sakuramata | H04N 1/387 358/448 |
| 2011/0043525 A1* | 2/2011 | Uchikura | G06T 19/00 345/427 |
| 2011/0242567 A1* | 10/2011 | Miyata | G06F 3/1208 358/1.13 |
| 2014/0078539 A1* | 3/2014 | Kakitsuba | G06F 3/1204 358/1.13 |

* cited by examiner

INFORMATION PROCESSING APPARATUS AND IMAGE PROCESSING SYSTEM FOR GENERATING IMAGE DATA FOR A PREVIEW IMAGE BY USING PRINT DATA DESCRIBED IN PAGE DESCRIPTION LANGUAGE

CROSS-REFERENCE TO RELATED APPLICATION

The present application claims the benefit of priority under 35 U.S.C. §119 of Japanese Patent Application No. 2015-246101, filed on Dec. 17, 2015, the contents of which are incorporated herein by reference in their entirety.

BACKGROUND OF THE INVENTION

1. Field of the Invention

The present invention relates to an information processing apparatus and an image processing system.

2. Description of the Related Art

Before a user outputs printed matter with a printer, the user may want to confirm whether the intended print result can be obtained. For this reason, there are printers having a function of displaying a preview image of print data on a display device.

Generally, a print job executed by a printer has print data that is optimized for being printed by the printer. This print data is not suitable for use as data for generating a preview image of any page requested by the user within a short period of time. Note that the print data is data that is described in a page description language (PDL) such as PostScript.

Specifically, in order for the printer to use the print data to generate a preview image of any requested page that is faithful to the print data, the print data up to the page before the requested page needs to be analyzed, and all of the information needed for generating a preview image of the requested page needs to be extracted. This is because specifications such as the font with respect to the requested page are often described in preceding pages.

For this reason, the printer needs to analyze the print data up to the page before the requested page and perform a process of generating a preview image, every time the printer switches from a preview image of a certain displayed page to a preview image of another page. Therefore, there are cases where a long time is taken until a preview image is displayed.

With respect to such an inconvenience, a technology of increasing the speed of displaying a preview image is devised (see, for example, Patent Document 1). Patent Document 1 discloses an image input apparatus for generating a simplified preview image, and then generating a final preview image that is faithful to the print data.

Patent Document 1: Japanese Unexamined Patent Application Publication No. 2010-238086

SUMMARY OF THE INVENTION

An aspect of the present invention provides an information processing apparatus and an image processing system in which one or more of the above-described disadvantages are reduced.

According to one aspect of the present invention, there is provided an information processing apparatus for generating image data by using drawing information for drawing an image, the information processing apparatus including a print data acquirer configured to acquire print data including the drawing information from outside; a request acceptor configured to accept a request to display the image data of any page in the print data; a reader configured to read specific drawing information of pages in the print data up to a page before the any page accepted by the request acceptor, from a drawing information storage configured to store the specific drawing information, which is the drawing information that may be applied to the image data of pages after a page in which the drawing information is described, among the drawing information included in the print data; and a generator configured to generate the image data of the any page by applying the specific drawing information read by the reader.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

The method of displaying a preview image disclosed in Patent Document 1 has a problem in that it is difficult to reduce the time taken to generate a final preview image. That is, with a simplified preview image, the print result that the user wants to confirm may not be correctly displayed.

Therefore, the user may not be able to determine whether the printed matter can be output, or the user may make an erroneous determination.

A problem to be solved by an embodiment of the present invention is to provide an information processing apparatus capable of reducing the time taken until image data of a requested page is displayed.

Embodiments of the present invention will be described by referring to the accompanying drawings.

Comparative Example

Figure 1:
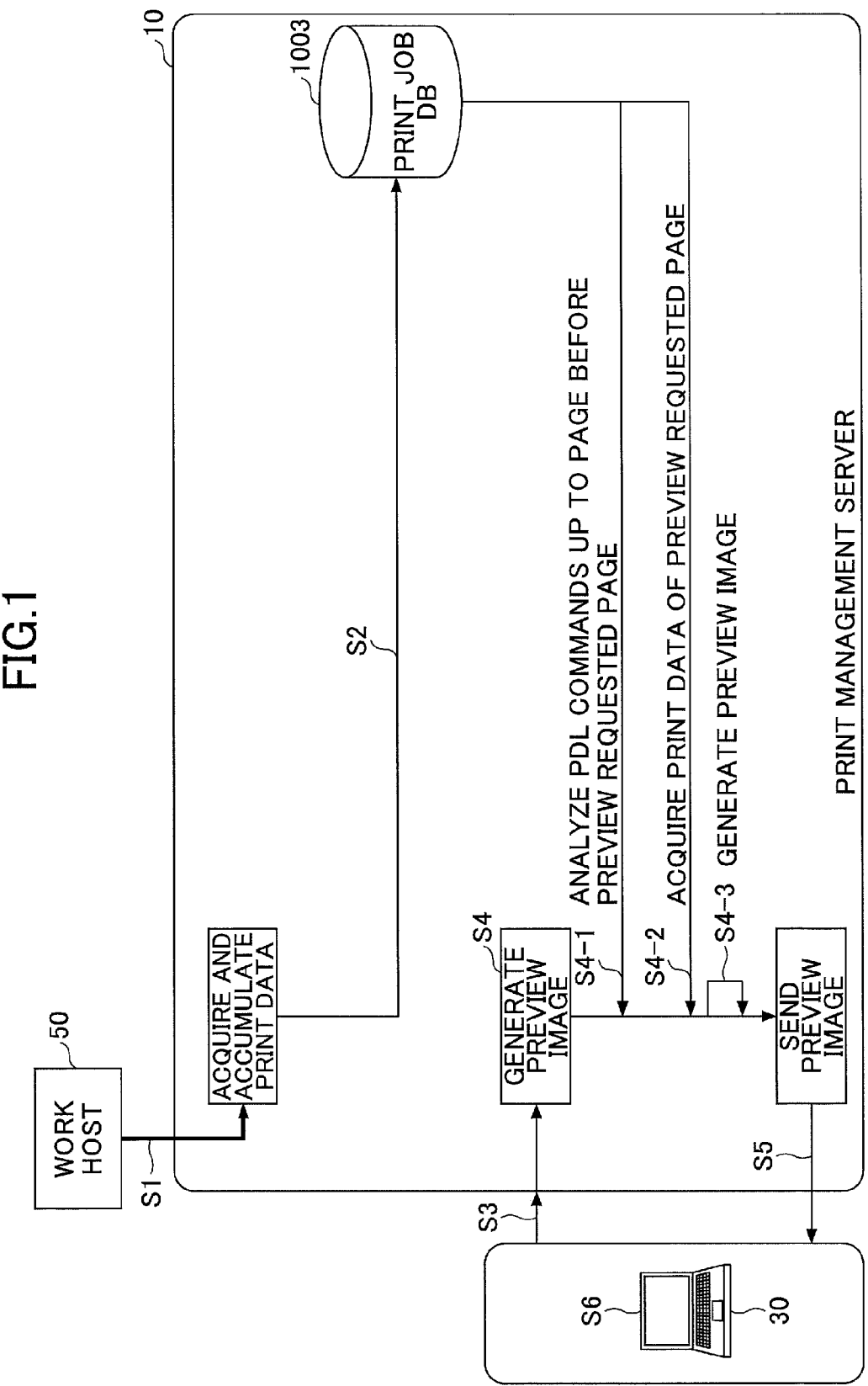
FIG. 1 is an example of a diagram for schematically describing a comparative example of procedures of displaying a preview image by a print management server.

First, a description is given of a comparative example, before describing an outline of a print management server 10 according to the present embodiment. FIG. 1 is an example of a diagram for schematically describing a comparative example of procedures of displaying a preview image by the print management server 10. The print management server 10 accepts print data from a work host 50, and accepts a request to display a preview image from a client 30.

Step S1: The print management server 10 accepts print data input from the work host 50 via a network. A print job is generated from this print data.

Step S2: The print management server 10 accumulates the print data in a print job database (DB) 1003.

Step S3: The client 30 operated by the user can acquire a list of print data stored in the print job DB 1003. The user selects a particular print data item from this list, or specifies any page, and sends a request to display a preview image to the print management server 10.

Step S4: The print management server 10 generates a preview image by performing the following processes of steps S4-1 through S4-3.

Step S4-1: The print management server 10 analyzes all of the PDL commands starting from the first page in the print data up to the page before the page for which display of a preview image has been requested (hereinafter referred to as "preview requested page"). Accordingly, the print management server 10 can acquire specific drawing information used for generating a preview image of the preview requested page. The specific drawing information is a PDL command that affects the generation of a preview image of the preview requested page; details of the specific drawing information are described below.

Step S4-2: The print management server 10 acquires the page data of the preview requested page, from the print data. The page data of the preview requested page is print data of the preview requested page, among the print data.

Step S4-3: The print management server 10 analyzes the print data of the preview requested page acquired in step S4-2, and generates a preview image of the preview requested page. In performing this process, the print management server 10 refers to the specific drawing information acquired in step S4-1.

Step S5: The print management server 10 sends the generated preview image to the client 30.

Step S6: The client 30 displays the preview image received from the print management server 10 on a display device.

As described above, the print management server 10 needs to analyze all of the pages before the preview requested page and acquire the specific drawing information in step S4-1, and therefore there have been cases where a long time is taken for the print management server 10 to generate a preview image.

<Outline of Print System According to the Present Embodiment>

Figure 2:
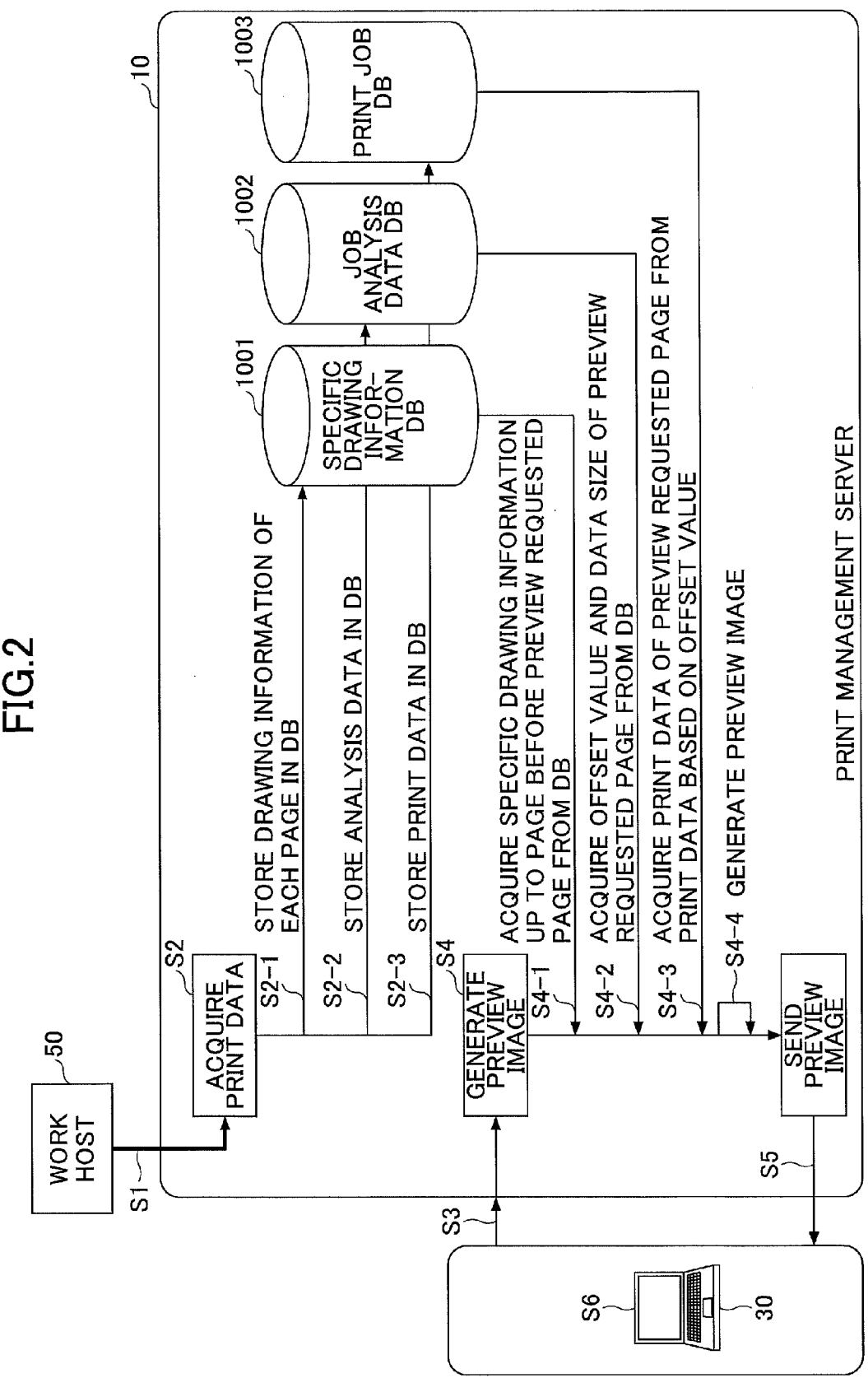
FIG. 2 is an example of a diagram for schematically describing procedures of displaying a preview image by the print management server according to an embodiment of the present invention.

FIG. 2 is an example of a diagram for schematically describing procedures of displaying a preview image by the print management server 10 according to the present embodiment.

Step S1: The print management server 10 accepts print data input from the work host 50 via a network.

Step S2: The print management server 10 generates the following three data items from the print data, and stores the generated data items in databases.

Step S2-1: The print management server 10 extracts, from the print data, specific drawing information that affects the drawing of pages after the page in which the PDL command is described, and stores the specific drawing information in a specific drawing information DB 1001.

Step S2-2: The print management server 10 analyzes the print data, and stores the offset value (the byte number counted from the beginning of the print data where the data of the page starts) and the data size of each page, in a job analysis data DB 1002.

Step S2-3: The print management server 10 stores the print data accepted from the work host 50, in the print job DB 1003.

Step S3: The client 30 operated by the user can acquire a list of print data stored in the print job DB 1003. The user selects a particular print data item from this list, or specifies any requested page, and sends a request to display a preview image to the print management server 10.

Step S4: The print management server 10 generates a preview image by performing the following processes of steps S4-1 through S4-3.

Step S4-1: The print management server 10 acquires the specific drawing information up to the page before the preview requested page, from the specific drawing information DB 1001 storing the specific drawing information.

Step S4-2: The print management server 10 acquires the offset value and the data size of the preview requested page from the job analysis data DB 1002 storing the analysis data.

Step S4-3: The print management server 10 acquires the print data of the preview requested page from the print job DB 1003, based on the offset value and data sizes acquired in step S4-2.

Step S4-4: The print management server 10 analyzes the print data of the preview requested page acquired in step S4-3 by applying the specific drawing information acquired in step S4-1, and generates a preview image of the preview requested page.

Step S5: The print management server 10 sends the generated preview image to the client 30.

Step S6: The client 30 displays the preview image received from the print management server 10 on a display device.

According to the processing procedures of FIG. 2, the specific drawing information of each page is stored in the specific drawing information DB 1001 at the time of acquiring the print data, and therefore at the time of generating a preview image, it is possible to omit the process of analyzing the pages from the beginning of the print data up to the page before the preview requested page. Furthermore, the location of the page data of the preview requested page (offset value and data size) is also stored in the job analysis data DB 1002 at the time of acquiring the print data, and therefore the print data of the preview requested page can be acquired at high speed from the print data.

Terminology

Drawing information is information for drawing an image or image data, and is information described in a page description language. A page description language is generally referred to as PDL. Specifically, as PDL, there are languages such as Printer Control Language (PCL), a derivative word of PCL, and PostScript (registered trademark); however, the type of language according to the present embodiment is not limited.

The minimum unit of the drawing information is referred to as a PDL command. A PDL command is an instruction relevant to drawing included in the print data. Furthermore, one or more PDL commands described for drawing an image of one page are referred to as page data. In the present embodiment, the drawing information is described by using the term PDL command.

Furthermore, the specific drawing information is a PDL command necessary for drawing a preview requested page (for generating a preview image). Alternatively, the specific drawing information may be described as a PCL command that may affect (that may be applied to) the drawing of the preview requested page. Specifically, there are PDL commands for specifying the font, a line, the fill, and the color of the fill; however, the PDL command is not so limited. Details are described by referring to table 2.

Print data is data for forming, generating, or drawing an image. A print job is an execution unit when a printer, etc., forms an image by using the print data. Furthermore, the print data includes one or more PDL commands. The print job includes print data, and also includes information for managing the print job. Note that the print data and the print job do not need to be strictly distinguished. Furthermore, forming, generating, or drawing an image means to convert the PDL command into an image (image data).

<System Configuration>

Figure 3:
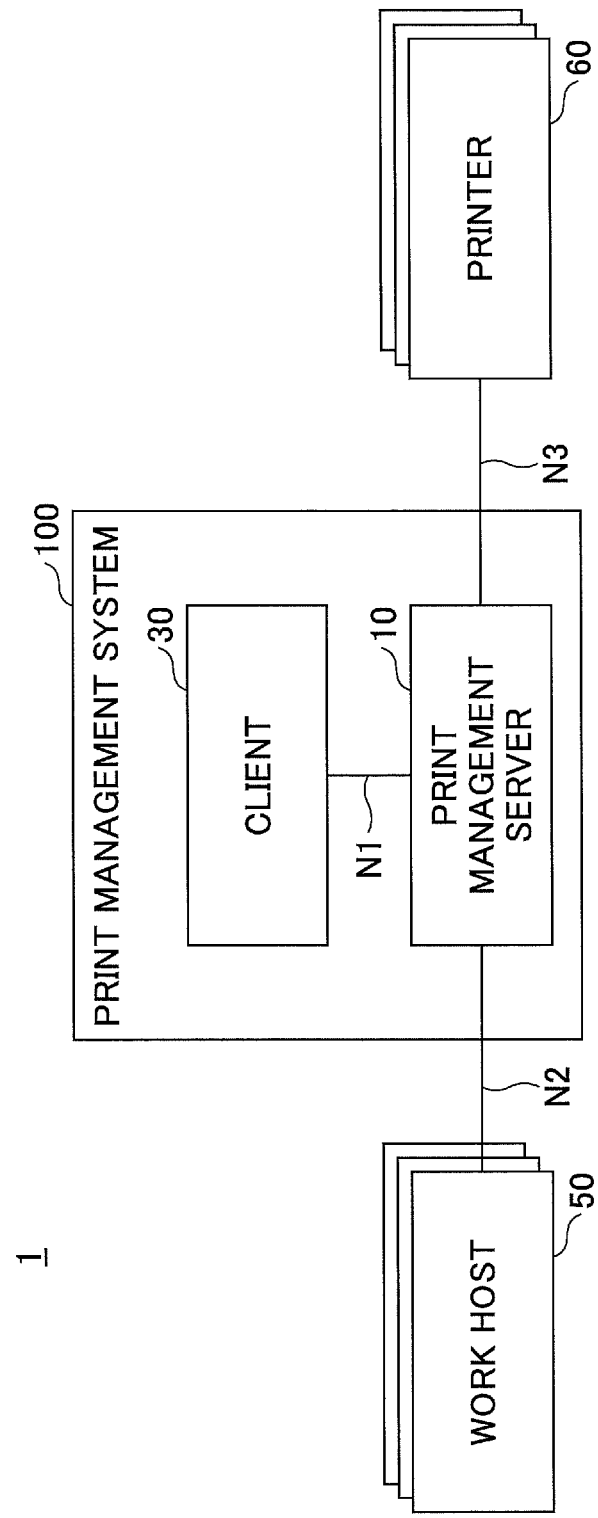
FIG. 3 is an example of a schematic configuration diagram of a print system according to an embodiment of the present invention.

FIG. 3 is an example of a schematic configuration diagram of a print system 1. The print system 1 includes the work host 50, a print management system 100, and a printer 60. The print management system 100 includes the client 30 and the print management server 10, and the client 30 and the print management server 10 are connected via a network N1. The print management server 10 and the work host 50 are connected via a network N2. The print management server 10 and the printer 60 are connected via a network N3. The network N1 is mainly a local area network (LAN); however, the network N1 may be a wide area network (WAN) or the Internet. Furthermore, the network N2 is the Internet or a WAN if the work host 50 is a device outside the company, and the network N2 is mainly a LAN if the work host 50 is a device inside the company. The network N3 is a LAN, a WAN, or the Internet; however, the elements may be connected in a one-on-one manner with a universal serial bus (USB) cable, etc. Note that the above descriptions of the networks N1 through N3 are merely examples and are not intended to limit the networks N1 through N3. The networks N1 through N3 may include an exclusive-use line, a network of a provider, or a communication line of a telecommunications company. Furthermore, the networks N1 through N3 may include a wireless LAN, Bluetooth (registered trademark), or a wireless communication network such as 3G and 4G, etc.

The work host 50 is an information processing apparatus in which an application software for printing for business purposes (hereinafter simply referred to as "application") operates. For example, the operator of the work host 50 uses the work host 50 to design or correct a form. The work host 50 may be provided as an exclusive-use device, or may be any information processing apparatus that can execute the application for business printing. The work host 50 sends print data, which is used by the print management server 10 for forming an image to be printed on a sheet by the printer 60, to the print management server 10. However, the print system 1 according to the present embodiment is not only used for special operations, but may be used when the client 30 displays a preview image of print data sent from a personal computer (PC) used in an office, etc., to the print management server 10.

The client 30 is an information processing apparatus in which a client application or a browser software, etc., operates. The client 30 displays a preview image and accepts operation input from a user. Specifically, the client 30 is an information processing apparatus such as a PC, a tablet terminal, a personal digital assistant (PDA), a wearable PC, a game console, a mobile phone, and a smartphone, etc. However, the client 30 is not so limited. The client application is software used by the user for recognizing the management state of the print job by the print management server 10. The client application periodically communicates with the print management server 10, and displays a list of print jobs registered in the print management server 10, the state of print jobs (not executed, being executed, and execution completed, etc.), and the error content when an error occurs, etc.

The print management server 10 is an information processing apparatus in which a server application operates. The print management server 10 may be a stand-alone information processing apparatus or may function as an information processing apparatus in a network to which cloud computing is applied. In the figure, the print management server 10 is connected to a plurality of work hosts 50 and a plurality of printers 60; however, one or more work hosts 50 and one or more printers 60 may be connected. The print management server 10 generates a print job from the print data accepted from the work host 50, and causes the printer 60 to print the print job. Specifically, the print management server 10 accepts print data, converts the print data into image data, outputs the image data to the printer 60, and provides the execution state of the print job by the printer 60. Furthermore, in the present embodiment, the print management server 10 is described as having a function of providing a preview image.

The printer 60 is an example of a so-called image forming apparatus. The printer 60 executes a print job sent from the print management server 10, and prints an image on a recording medium such as a sheet, based on print data. One example of the printer 60 performs an image forming process of forming a latent image with a laser on a charged recording medium and developing the latent image with toner. Another example of the printer 60 performs an image forming process of discharging ink to form an image. Any kind of image forming process may be used in the present embodiment. Furthermore, the printer 60 includes a copier, a fax machine, a scanner device, and a multi-functional printer (MFP), etc., having a function of forming images. Furthermore, the printer 60 may not include a mechanism of conveying a recording medium.

<Hardware Configuration>

Figure 4:
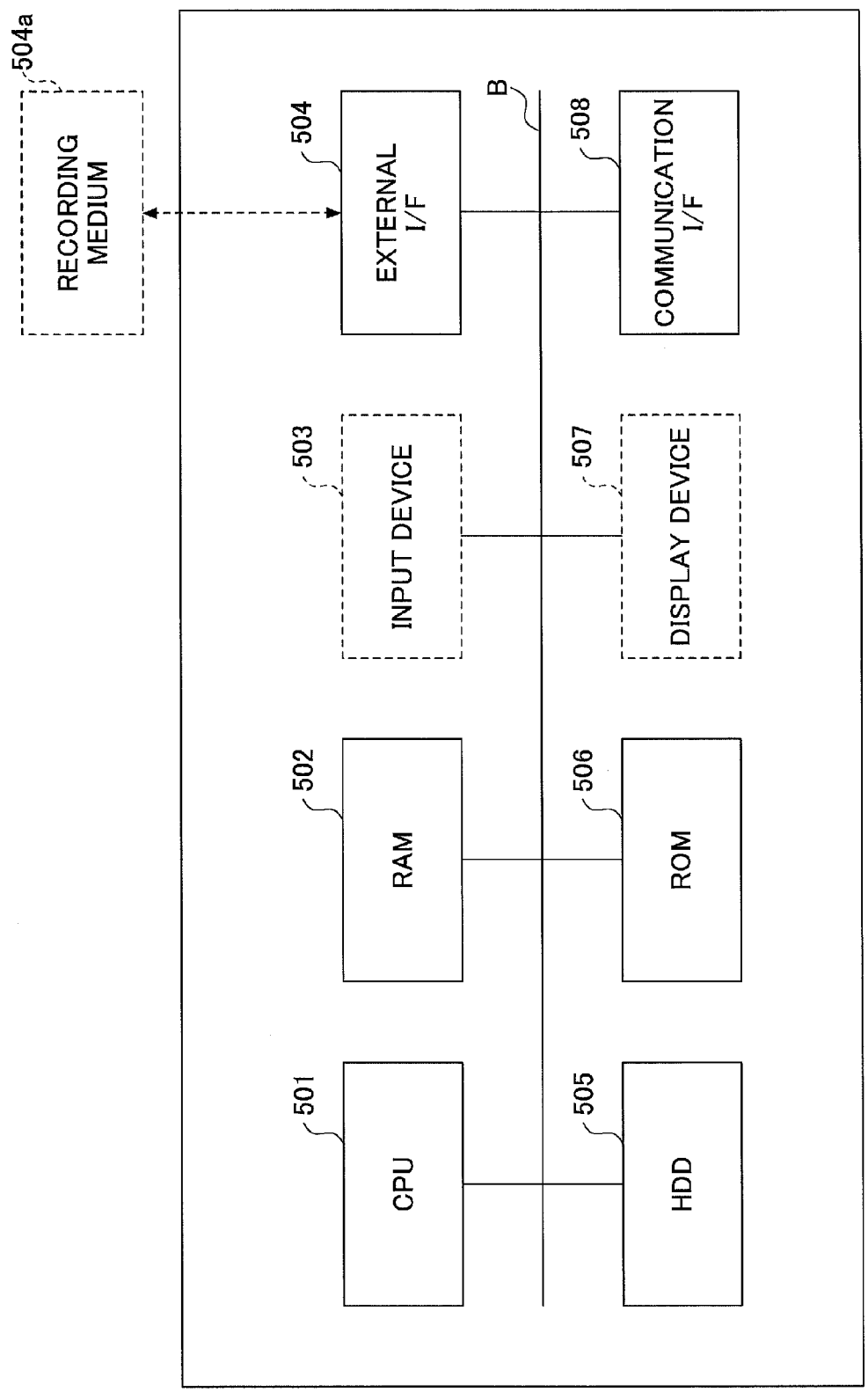
FIG. 4 is an example of a hardware configuration diagram of the print management server according to an embodiment of the present invention.

FIG. 4 is an example of a hardware configuration diagram of the print management server 10 according to the present embodiment. The print management server 10 includes a central processing unit (CPU) 501, a random access memory (RAM) 502, an input device 503, an external interface (I/F) 504, a hard disk drive (HDD) 505, a read-only memory (ROM) 506, a display device 507, and a communication I/F 508, etc., which are connected to each other by a bus B. Note that the input device 503 and the display device 507 may be in a form of being connected and used according to need.

The CPU 501 is an arithmetic device that loads programs and data from a storage device such as the ROM 506 and the HDD 505 into the RAM 502, and executes processes to control the entire print management server 10 and realize functions of the print management server 10.

The input device 503 includes a keyboard, a mouse, and a touch panel, etc., and is used by the user for inputting operation signals The external I/F 504 is an interface between the print management server 10 and an external device. An example of the external device is a recording medium 504a. Accordingly, the print management server 10 is able to read from and/or write in the recording medium 504a via the external I/F 504. Examples of the recording medium 504a are a flexible disk, a compact disk (CD), digital versatile disk (DVD), a secure digital (SD) memory card, and a universal serial bus (USB) memory, etc.

The HDD 505 is an example of a non-volatile storage device storing programs and data. The stored programs and data include, for example, an operating system (OS) that is the basic software controlling the entire print management server 10, and the applications for supplying various functions in the OS. Note that the print management server 10 may include a drive device using a flash memory as the recording medium (for example, a solid state drive (SSD)), instead of the HDD 505.

The ROM 506 is an example of a non-volatile semiconductor memory (storage device) that can store programs and data even after the power is turned off. The ROM 506 stores programs and data such as a basic input/output system (BIOS) that is executed when the print management server 10 is activated, OS settings, and network settings, etc. The RAM 502 is an example of a volatile semiconductor memory (storage device) that temporarily stores programs and data.

The communication I/F 508 is an interface for connecting the print management server 10 to various networks. Accordingly, the print management server 10 is able to perform data communication via the communication I/F 508. The display device 507 includes a display, etc., and displays processing results by the print management server 10.

Note that the hardware elements of the print management server 10 in the figure do not need to be accommodated in a single housing case or provided collectively as a single device. These elements indicate the hardware elements that are preferably provided in the print management server 10. Furthermore, in order to respond to cloud computing, the physical configuration of the print management server 10 according to the present embodiment may not be fixed; hardware resources may be dynamically connected or disconnected according to the load.

The hardware configurations of the client 30 and the work host 50 are the same as the hardware configuration of FIG. 4; however, even if the hardware configurations are different, it is assumed that such a difference does not affect the description of the present embodiment. Furthermore, the printer 60 is assumed to have a known hardware configuration.

<Functions>

Figure 5:
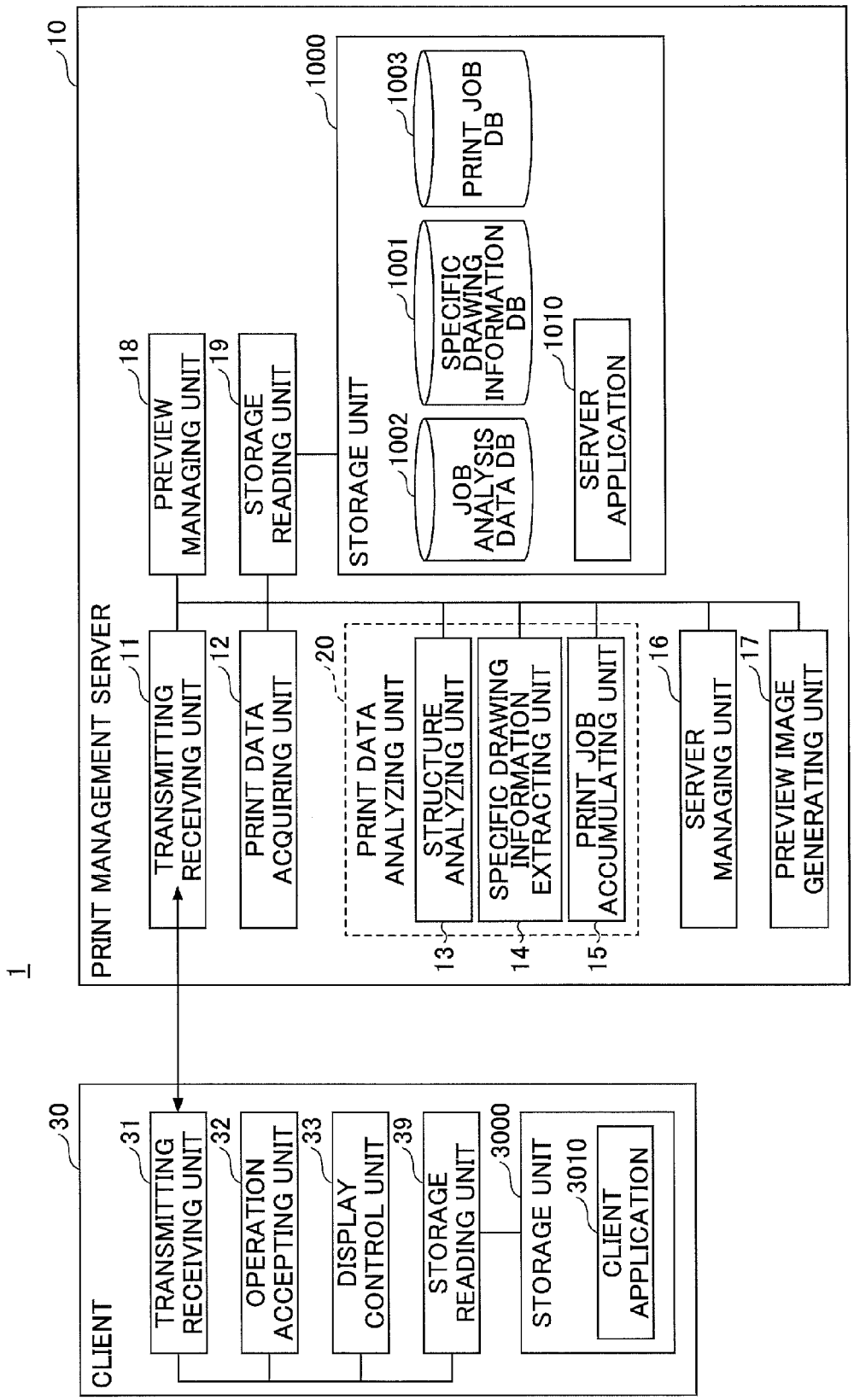
FIG. 5 is an example of a functional block diagram of the print management server and a client included in the print system according to an embodiment of the present invention.

FIG. 5 is an example of a functional block diagram of the print management server 10 and the client 30 included in the print system 1 according to the present embodiment.

<<Functional Configuration of Print Management Server 10>>

The print management server 10 includes a transmitting receiving unit 11, a print data acquiring unit 12, a structure analyzing unit 13, a specific drawing information extracting unit 14, a print job accumulating unit 15, a server managing unit 16, a preview image generating unit 17, a preview managing unit 18, and a storage reading unit 19. These units are functions that are realized or means that are provided as any of the elements illustrated in FIG. 4 are operated by instructions from the CPU 501 according to a server application 1010 loaded in the RAM 502 from the HDD 505.

Furthermore, the print management server 10 includes a storage unit 1000 that is constructed by any one of the RAM 502, the ROM 506, and the HDD 505 illustrated in FIG. 4. The storage unit 1000 stores the specific drawing information DB 1001, the job analysis data DB 1002, and the print job DB 1003. The storage unit 1000 stores the server application 1010. The server application 1010 is distributed in a state of being stored in the recording medium 504a, or downloaded from a server that delivers programs. These DBs are described below.

TABLE 1

| ID | JOB NAME | ... | DATA START OFFSET OF FIRST PAGE | DATA SIZE OF FIRST PAGE | ... | DATA START OFFSET OF nTH PAGE | DATA SIZE OF nTH PAGE | NUMBER OF PAGES | ... |
|---|---|---|---|---|---|---|---|---|---|
| 001 | ABCD | ... | 250 | 596 | ... | 10510 | 1000 | 1000 | ... |
| 002 | EFGH | ... | 245 | 400 | ... | 9080 | 800 | 2000 | ... |
| 003 | ABCJ | ... | 300 | 210 | ... | 5130 | 600 | 1500 | ... |
| : | : | : | : | : | : | : | : | : | : |

Table 1 indicates information included in the job analysis data DB 1002 constructed in the storage unit 1000 of the print management server 10, in the form of a table. This table is referred to as an analysis data table. The analysis data table includes a job name, a data start offset and a data size of each page, and the number of pages included in the print data, etc., registered in association with job identification (ID).

The job analysis data DB 1002 stores analysis data obtained as the structure analyzing unit 13 analyzes print data acquired from the work host 50. More specifically, analysis data includes position information indicating the location at which each page is stored in the print data (more specifically, address information) and a data size.

The job ID is identification information for uniquely identifying a print job by the print management server 10. The print management server 10 applies a job ID that is not duplicate, to a print job. Specifically, a job ID is a serial number, a registration time and date, and a combination of an identification number of the work host 50 and a serial number, etc.; however, the job ID is not so limited. Furthermore, identification information is a name, a symbol, a character string, a value, or a combination of these elements, that is used for uniquely distinguishing a target to be identified from a plurality of targets. The same applies to various kinds of identification information described below.

The data start offset is position information indicating the location of each page data item in the print data. Specifically, the data start offset is an offset value that indicates the byte number counted from the beginning of the print data, where the stored page data starts. One page data item in the print data starts from a PDL command indicating the start and ends at a PDL command indicating the end. Therefore, the start and the end of one page data item is clearly described.

The data size indicates the size or the volume of data of each page data item in units of bytes. The size of one page data item starts from a PDL command indicating the start of one page data item to a PDL command indicating the end of one page data item.

Furthermore, the number of pages is the total number of pages included in the print data. The total number of pages may be clearly described in the print data by a PDL command, or may be counted based on the PDL commands indicating start and end.

Examples of the PDL command to be the specific drawing information include a PDL command instructing the print area (the number of millimeters from the edge of the sheet indicating the position from which the image is formed), a PDL command instructing the orientation of the image data by rotation information (the rotational angle such as 0 degrees, 90 degrees, 180 degrees, and 270 degrees, etc.), a PDL command instructing a font, a PDL command controlling the font, a PDL command defining the form (the format of the table and the lines, etc.), a PDL command controlling the form, a PDL command defining brush (fill, hatching, and the texture, etc.), and a PDL command controlling brush, etc.; however, the PDL command is not so limited. Note that as PDL commands for controlling the font, the form, and brush include a PDL command for specifying or releasing the font, the form, and brush.

These PDL commands extracted to the specific drawing information DB 1001 are handled as an enabled PDL command once the PDL command is specified until the PDL command is specified next or the PDL command is released (enabled means that the PDL command is used for gener-

TABLE 2

| | SIZE NUMBER OF COMMANDS | | | NUMBER OF PRINT JOBS INFORMATION DATA SIZE NUMBER OF ACCUMULATED COMMANDS | | |
|---|---|---|---|---|---|---|
| FIRST JOB | COMMAND INFORMATION (FIRST COMMAND) | TYPE | ADDITIONAL INFORMATION 1 | ADDITIONAL INFORMATION 2 SIZE DATA | ... | ADDITIONAL INFORMATION k |
| : | : | | | : | | |
| | COMMAND INFORMATION (nTH COMMAND) | TYPE | ADDITIONAL INFORMATION 1 | ADDITIONAL INFORMATION 2 SIZE DATA | ... | ADDITIONAL INFORMATION k |
| : | : | | | : | | |
| | SIZE NUMBER OF COMMANDS | | | INFORMATION DATA SIZE NUMBER OF ACCUMULATED COMMANDS | | |
| nTH JOB | COMMAND INFORMATION (FIRST COMMAND) | TYPE | ADDITIONAL INFORMATION 1 | ADDITIONAL INFORMATION 2 SIZE DATA | ... | ADDITIONAL INFORMATION k |
| | : | | | : | | |
| | COMMAND INFORMATION (nTH COMMAND) | TYPE | ADDITIONAL INFORMATION 1 | ADDITIONAL INFORMATION 2 SIZE DATA | ... | ADDITIONAL INFORMATION k |

Table 2 indicates information included in the specific drawing information DB 1001 constructed in the storage unit 1000 of the print management server 10, in the form of a table. This table is referred to as a specific drawing information table. The above specific drawing information is registered in the specific drawing information DB 1001. The information registered in the specific drawing information table is relevant to a PDL command that is determined as necessary for drawing a subsequent page extracted by the specific drawing information extracting unit 14 from print data sent from the work host 50. For example, in one embodiment, the information registered in the specific drawing information table is relevant a PDL command necessary for generating a preview image of any page in the form of table 2.

ating an image). Therefore, a PDL command of a page before the preview requested page may affect the drawing of the preview requested page. In order to respond to any page, the information relevant to PDL commands of all pages is registered.

Note that a PDL command indicating start and a PDL command indicating end of one page data item, which are used for detecting the break between pages, are also extracted and registered in the specific drawing information DB 1001.

The specific drawing information table includes the number of print jobs. For each print job, the size, the number of commands, and command information of each command used in the print data are registered.

The number of print jobs is the number of print jobs registered in the specific drawing information DB 1001. The size is the size of the specific drawing information registered in the specific drawing information DB 1001 with respect to one print job. The size is used by the print management server 10 for reading the requested specific drawing information. The number of commands is the number of PDL commands extracted in one print job. The command information further includes the type, a k number of additional information items (k is one or more), the size, and the data. The type is an ID indicating the type of the PDL command. For example, a PDL command indicating the start of one page data item and a PDL command indicating the end of one page data item are not used for generating a preview image, and therefore the print management server 10 is able to recognize the type of the PDL command and determine whether the PDL command is to be read from the specific drawing information DB 1001. Note that the above two PDL commands are used for detecting the break between pages (an example of drawing information that is not specific drawing information).

The additional information is information for the print management server 10 to determine whether the PDL command is to be used for generating a preview image. A supplemental description is given of the additional information. For example, a PDL command defining the font defines the font as in font ID1=font A, font ID2=font B, and font ID3=font C. Furthermore, when defining the font, there is a case of defining a font inside the printer 60 and a case of defining a font inside the PDL command created by bitmap. In these cases, an indication to distinguish between defining a font in the printer 60 and defining a font in the PDL command, is registered in the additional information, together with an ID of a font. When the indication is to use a font set inside the printer 60, the print management server 10 is able to use the font if the ID of the font is known, and therefore the print management server 10 determines that there is no need to read the PDL command. When the indication is to use a font included in the PDL command, the contents of the font are in the PDL command, and therefore the print management server 10 determines that there is a need to read the PDL command.

Furthermore, a PDL command for controlling the font includes a PDL command for using the font and a PDL command for releasing the usage of the font. A PDL command for using the font has additional information indicating the ID of the font and a message that the font will be used. In this case, there may be descriptions relevant to the font in the PDL command (for example, a new definition or the usage method, etc., relevant to the font), and therefore the print management server 10 determines that there is a need to read the PDL command. A PDL command for releasing the usage of the font has additional information indicating the ID of the font and a message that the font will not be used. In this case, the print management server 10 determines that there is no need to read the PDL command.

As described above, the print management server 10 can determine whether there is a need to read the PDL commands up to the page before the preview requested page, according to the additional information.

The size means the size of the PDL command. The size indicates the position from which one PDL command starts and the position where the PDL command ends. When generating a preview image as described above, the print management server 10 may read a PDL command, and it is possible to identify and read one PDL command according to this size. That is, when the print management server 10 generates a preview image of the preview requested page, it is possible to identify the position from which one PDL command starts and the position where the PDL command ends in the specific drawing information DB 1001, without analyzing the PDL command.

The data is a copy of the PDL command. The PDL command is copied because there may be cases where the whole PDL command is needed for generating a preview image of the preview requested page, as described with respect to the additional information.

Note that the specific drawing information includes job information (print orientation/sheet size/specified tray), etc.; however, the job information is omitted in table 2. The job information may be specified for each page, and is used for generating a preview image of the preview requested page.

TABLE 3

| FIRST JOB INFORMATION | JOB DATA SIZE PRINT JOB DATA |
|---|---|
| ⋮ | ⋮ |
| nTH JOB INFORMATION | JOB DATA SIZE PRINT JOB DATA |

Table 3 indicates information included in the print job DB 1003 constructed in the storage unit 1000 of the print management server 10, in the form of a table. This table is referred to as a print job table. In the print job DB 1003, the job data size and print job data is registered for each job. The print management server 10 print job DB 1003 is able to read any print job from the print job DB 1003.

(Functions of Print Management Server 10)

The transmitting receiving unit 11 of the print management server 10 is realized by the CPU 501 and the communication I/F 508, etc., illustrated in FIG. 4. The transmitting receiving unit 11 sends and receives various kinds of data with the client 30 and the work host 50, etc. Note that in the following, when the print management server 10 sends and receives data, the description of "via the transmitting receiving unit 11" may be omitted.

The print data acquiring unit 12 of the print management server 10 is realized by the CPU 501, etc., illustrated in FIG. 4. The print data acquiring unit 12 detects that the data sent from the work host 50 is print data based on the header part, etc., and acquires the print data. The print data acquiring unit 12 generates and applies a job ID and stores the print data in a single file.

When the structure analyzing unit 13, the specific drawing information extracting unit 14, and the print job accumulating unit 15 are not distinguished from each other, these are collectively referred to as a print data analyzing unit 20. First, the structure analyzing unit 13 of the print management server 10 is realized by the CPU 501, etc., illustrated in FIG. 4. The structure analyzing unit 13 analyzes the print data, generates an analysis data table indicated in table 1, and stores the analysis data table in the job analysis data DB 1002.

The specific drawing information extracting unit 14 of the print management server 10 is realized by the CPU 501, etc., illustrated in FIG. 4. The specific drawing information extracting unit 14 analyzes the print data, generates a specific drawing information table as indicated in table 2, and stores the specific drawing information table in the specific drawing information DB 1001.

The print job accumulating unit 15 of the print management server 10 is realized by the CPU 501, etc., illustrated in FIG. 4. The print job accumulating unit 15 stores a PDL command for which the analysis has been completed, from the print data into the print job DB 1003 as needed. The print job accumulating unit 15 stores the print data as a print job in the print job DB 1003. Note that when the print data is acquired from the work host 50, the print data may be stored in the print job DB 1003.

The server managing unit 16 of the print management server 10 is realized by the CPU 501, etc., illustrated in FIG. 4. The server managing unit 16 controls the overall print management server 10 when the print management server 10 operates as a server. For example, by using the communication between the print management server 10 and the client 30, the server managing unit 16 sends a list of print jobs, the state of print jobs (not executed, being executed, and execution completed, etc.), and the error content when an error occurs, etc., to the client. Furthermore, the server managing unit 16 acquires a request to display a preview image from the client 30, and sends the preview image. Alternatively, the server managing unit 16 operates as a web server or a web application, and sends screen information such as Hyper Text Markup Language (HTML), JavaScript (registered trademark) data, and Cascading Style Sheets (CSS), to the client 30.

The preview managing unit 18 of the print management server 10 is realized by the CPU 501, etc., illustrated in FIG. 4. The preview managing unit 18 implements control for generating a preview image. For example, the preview managing unit 18 accesses the job analysis data DB 1002 and the specific drawing information DB 1001 to acquire information (mainly specific drawing information) necessary for generating a preview image.

The preview image generating unit 17 of the print management server 10 is realized by the CPU 501, etc., illustrated in FIG. 4. The preview image generating unit 17 uses the information necessary for generating a preview image acquired by the preview managing unit 18, to generate a preview image. That is, the preview image generating unit 17 interprets the PDL command, performs a process referred to as rendering, and generates image data. Note that the format of the image data may be Joint Photographic Experts Group (JPEG), bitmap, or graphics interchange format (GIF), etc.; however, the format is not so limited.

The storage reading unit 19 is realized by the CPU 501, etc., illustrated in FIG. 4. The storage reading unit 19 reads various kinds of data stored in the storage unit 1000, and writes various kinds of data in the storage unit 1000. Note that in the following, even when the storage reading unit 19 reads and writes data with respect to the storage unit 1000, the description of "via the storage reading unit 19" may be omitted.

<<Functional Configuration of Client 30>>

The client 30 includes a transmitting receiving unit 31, an operation accepting unit 32, a display control unit 33, and a storage reading unit 39. These units are functions that are realized or means that are provided as any of the elements illustrated in FIG. 4 are operated by instructions from the CPU 501 according to a program loaded in the RAM 502 from the HDD 505.

Furthermore, the client 30 includes a storage unit 3000 that is constructed by any one of the RAM 502, the ROM 506, and the HDD 505 illustrated in FIG. 4. The storage unit 3000 stores a client application 3010. The client application 3010 is distributed in a state of being stored in the recording medium 504a, or downloaded from a server that delivers programs.

The operation accepting unit 32 of the client 30 is realized by the CPU 501 and the input device 503, etc., illustrated in FIG. 4. The operation accepting unit 32 accepts various kinds of operations input to the client 30 by a user.

The display control unit 33 of the client 30 is realized by the CPU 501 and the display device 507, etc., illustrated in FIG. 4. The display control unit 33 displays various kinds of information on the display device 507. In the present embodiment, the display control unit 33 displays a preview image on the display device 507.

The storage reading unit 39 is realized by the CPU 501, etc., illustrated in FIG. 4. The storage reading unit 39 reads various kinds of data stored in the storage unit 3000, and writes various kinds of data in the storage unit 3000. Note that in the following, even when the storage reading unit 39 reads and writes data with respect to the storage unit 3000, the description of "via the storage reading unit 39" may be omitted.

<Operation Procedures>

Figure 6:
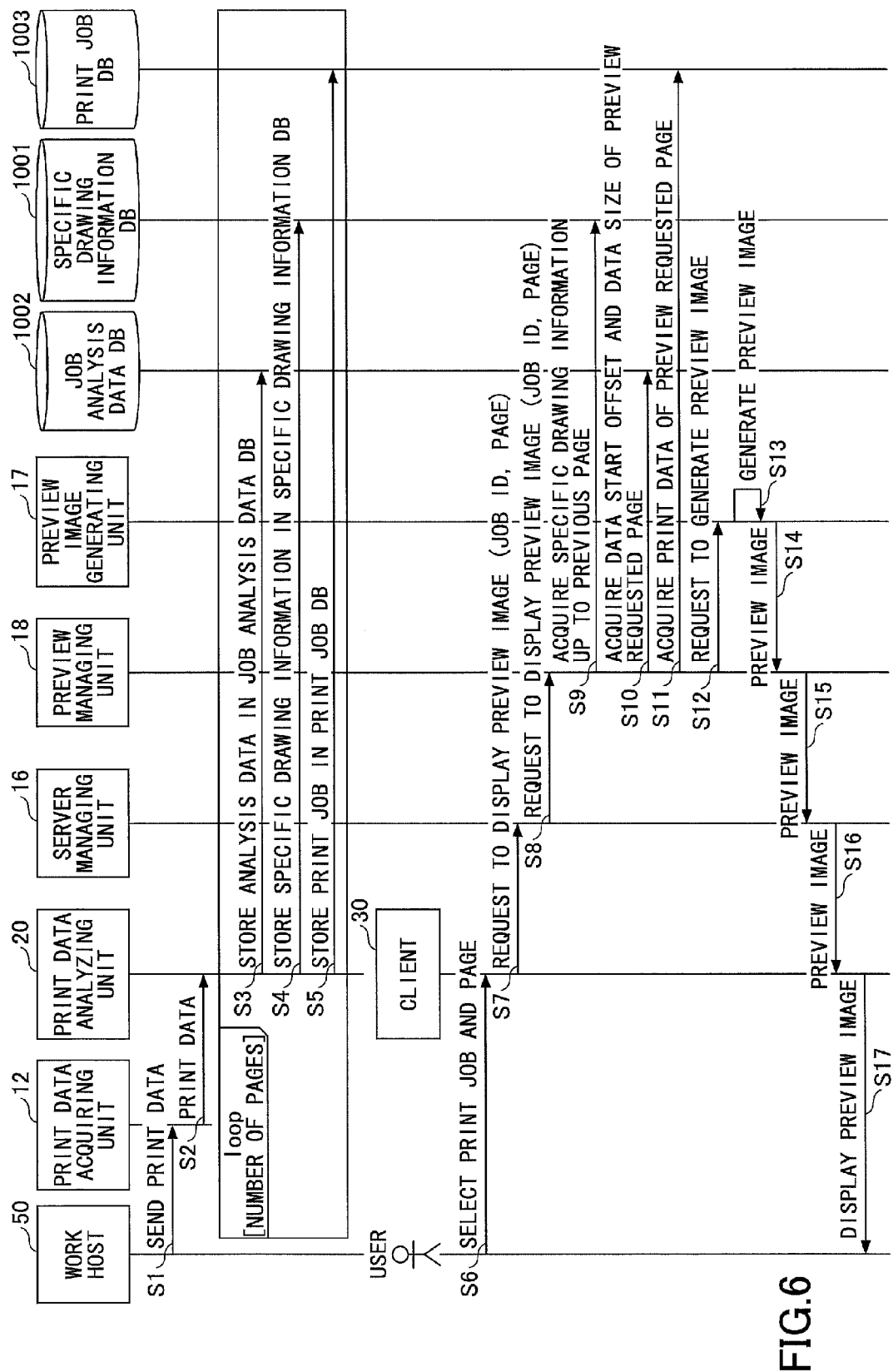
FIG. 6 is an example of a sequence diagram indicating procedures for acquiring print data to displaying a preview image according to an embodiment of the present invention.

FIG. 6 is an example of a sequence diagram indicating procedures for acquiring print data to displaying a preview image.

Step S1: The work host 50 sends the created print data to the print management server 10. The print data acquiring unit 12 of the print management server 10 acquires the print data. The print data acquiring unit 12 generates and applies a job ID, and stores the print data in a single file.

Step S2: The print data acquiring unit 12 sends the print data to the print data analyzing unit 20.

Step S3: The structure analyzing unit 13 of the print management server 10 receives the report from the print data acquiring unit 12, analyzes the print data, and stores the analysis data in the job analysis data DB 1002. Details are described by referring to FIG. 8.

Step S4: The specific drawing information extracting unit 14 of the print management server 10 receives the report from the print data acquiring unit 12, analyzes the print data, extracts specific drawing information, and stores the specific drawing information in the specific drawing information DB 1001. Details are described by referring to FIG. 8.

Step S5: The print job accumulating unit 15 of the print management server 10 creates a print job from the print data. Specifically, the print job accumulating unit 15 confirms whether information necessary for the print data is applied, and applies a file name. Then, the print job accumulating unit 15 stores the print job in the print job DB 1003.

Next, the user operates the client 30 at any timing, and requests the client 30 to display a preview image.

Step S6: The user operates the client 30, logs into the print management server 10, and acquires a list of print jobs from the server managing unit 16. The server managing unit 16 may provide only the print jobs for which the user has the authority to use. The user selects any one of the print jobs and a page of the print job for which the user wants to display a preview image, from a graphical user interface (GUI) screen displayed on the display device 507 by the client 30. The operation accepting unit 32 of the client 30 accepts a selection of a print job and a page (preview requested page).

Step S7: The client 30 sends, to the print management server 10, the job ID of the print job and the preview requested page selected by the user, together with a request to display the preview image.

Step S8: The server managing unit 16 of the print management server 10 sends, to the preview managing unit 18, the job ID of the print job and the page (preview requested page) selected by the user, to cause the preview managing unit 18 to generate a preview image.

Step S9: The preview managing unit 18 of the print management server 10 reads the specific drawing information up to the page before the preview requested page, from the specific drawing information DB 1001.

Step S10: The preview managing unit 18 acquires the data start offset (offset value) and the data size of the preview requested page, from the job analysis data DB 1002.

Step S11: The preview managing unit 18 acquires the print data of the preview requested page from the print job DB 1003, based on the offset value and the data size.

Step S12: The preview managing unit 18 sends, to the preview image generating unit 17, the specific drawing information up to the page before the preview requested page acquired in step S9 and the print data of the preview requested page acquired in step S11, and requests the preview image generating unit 17 to generate a preview image.

Step S13: The preview image generating unit 17 generates a preview image based on the specific drawing information up to the page before the preview requested page and the print data of the preview requested page transferred from the preview managing unit 18. Details are described by referring to FIG. 9.

Step S14: The preview image generating unit 17 sends the generated preview image to the preview managing unit 18.

Step S15: The preview managing unit 18 sends the preview image acquired from the preview image generating unit 17, to the server managing unit 16.

Step S16: The server managing unit 16 sends the preview image acquired from the preview managing unit 18, to the client 30.

Step S17: The client 30 receives the preview image from the server managing unit 16, and the display control unit 33 displays the preview image on the display device 507.

By the above procedures, the specific drawing information for generating a preview image is stored for each page in the specific drawing information DB 1001 when the print data is acquired, and the offset value of each page is stored in the job analysis data DB 1002, and therefore the time taken to generate a preview image can be reduced.

<Display of Preview Image while Analyzing Print Data>

Figure 7:
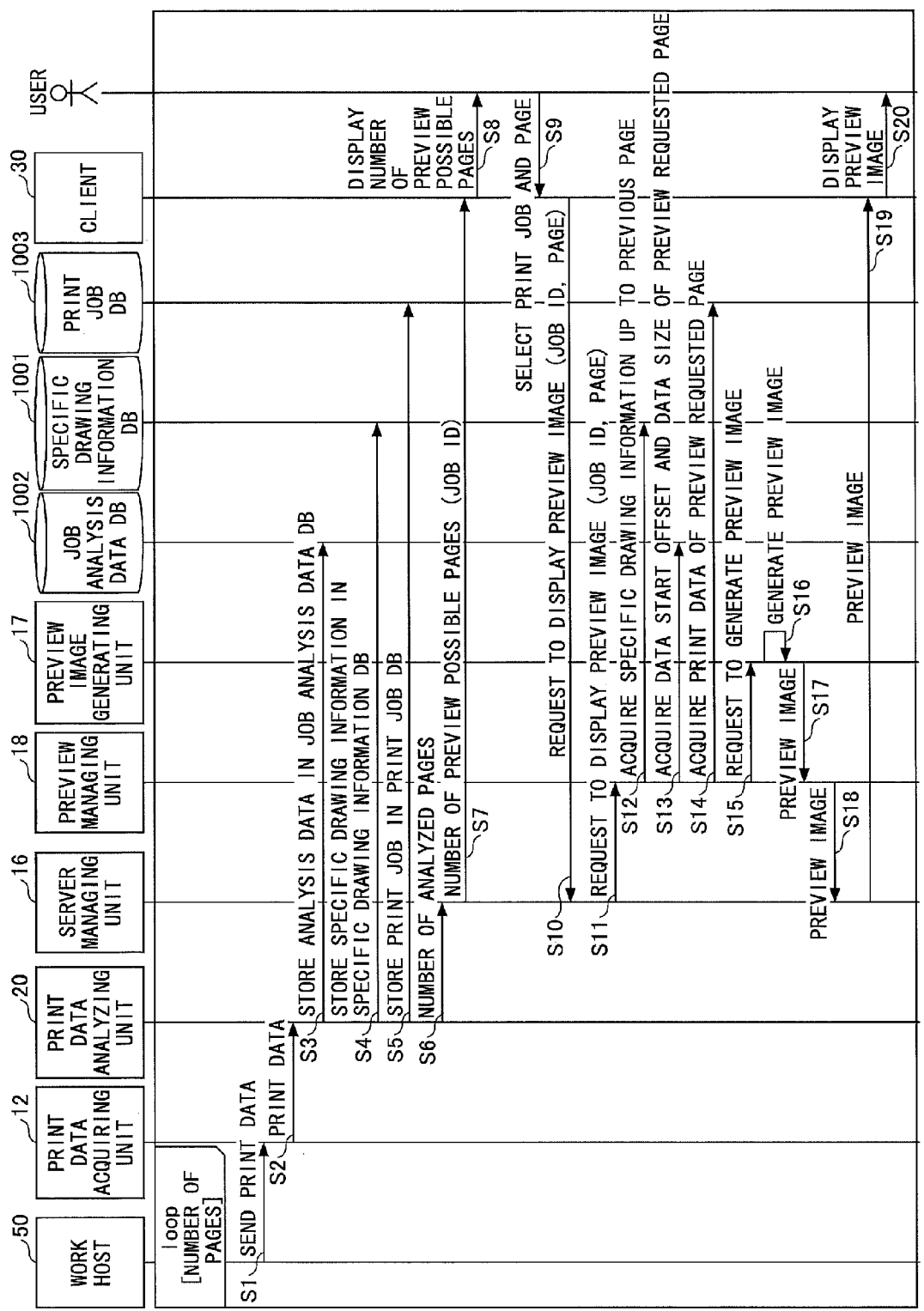
FIG. 7 is an example of a sequence diagram indicating procedures for displaying a preview image while analyzing print data according to an embodiment of the present invention.

FIG. 7 is an example of a sequence diagram indicating procedures for displaying a preview image while analyzing print data. Note that in FIG. 7, the differences between FIG. 6 and FIG. 7 are mainly described. The processes of steps S1 through S7 are the same as the processes of FIG. 6.

Step S6: The print data analyzing unit 20 of the print management server 10 reports the number of pages that have been analyzed, to the server managing unit 16. Accordingly, the server managing unit 16 is able to determine whether the preview requested page has been analyzed, in response to the request to display a preview image from the client 30.

Step S7: The server managing unit 16 of the print management server 10 reports, to the client 30, the page number up to which an image can be previewed in the print data being analyzed or the page number up to which the print data has been analyzed (hereinafter referred to as "number of preview possible pages), together with the job name and the job ID of the print job. Note that the client application of the client 30 has logged into the print management server 10, and periodically communicates with the print management server 10. Therefore, even when the client 30 and the print management server 10 are blocked by a firewall, etc., the print management server 10 can report the number of preview possible pages at any timing. In principle, the server managing unit 16 is able to report the number of preview possible pages to the client 30, every time the analysis of one page is ended. However, in consideration of the communication load, the server managing unit 16 may report the number of preview possible pages in units of 5 pages or in units of 10 pages. Furthermore, in FIG. 7, the print management server 10 reports the number of preview possible pages to the client 30; however, the print management server 10 may report the number of preview possible pages to the client 30 only when a query is received from the client 30.

Step S8: The transmitting receiving unit 31 of the client 30 receives the job name, the job ID, and the number of preview possible pages, and the display control unit 33 displays the number of preview possible pages on the display device 507.

Step S9: The user selects a print job according to a job name displayed by the client 30 together with the number of preview possible pages, and performs an operation to display the preview image of any page (preview requested page). The operation accepting unit 32 of the client 30 accepts the selection of the print job and the selection of the preview requested page.

Step S10: The transmitting receiving unit 31 of the client 30 sends the job ID and the page (preview requested page) of the print job to the print management server 10, together with a request to display a preview image.

The subsequent processes of steps S11 through S20 are the same as the processes of steps S8 through S17 of FIG. 6.

By the above process, the client 30 is able to display a preview image of a page for which the analysis is completed, while the print data is being analyzed.

<Acquisition of Analysis Data and Specific Drawing Information>

Figure 8:
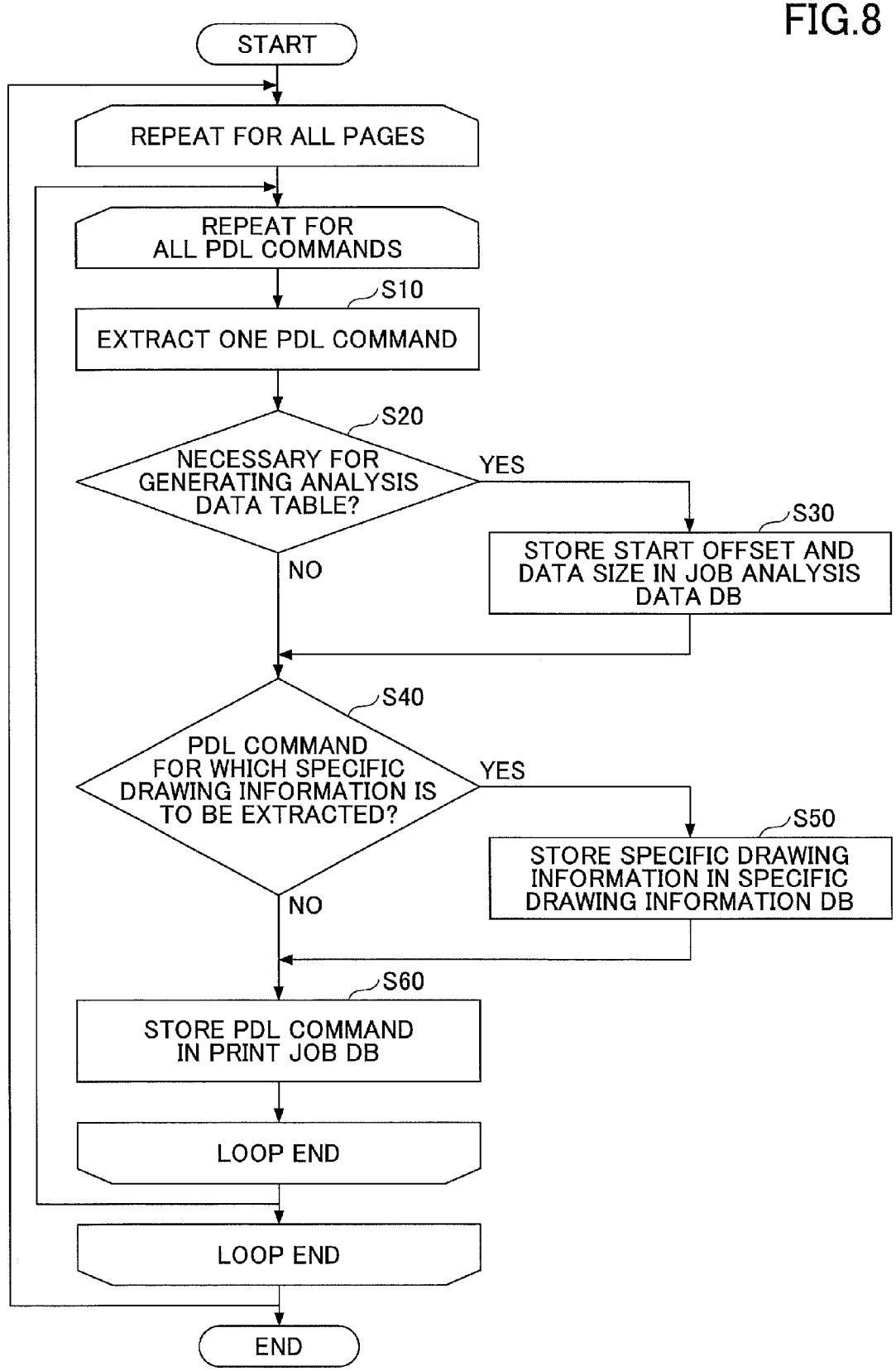
FIG. 8 is an example of a flowchart indicating procedures for acquiring analysis data and specific drawing information from the print data by the print management server according to an embodiment of the present invention.

FIG. 8 is an example of a flowchart indicating procedures for acquiring analysis data and specific drawing information from the print data by the print management server 10. The process of FIG. 8 starts as the print management server 10 acquires the print data. The process of FIG. 8 is started, for example, when the print management server 10 acquires the print data. The process of FIG. 8 is repeatedly executed for each PDL command of each page data item.

The structure analyzing unit 13 of the print management server 10 sequentially extracts, one by one, PDL commands of the print data acquired by the print data acquiring unit 12, starting from the top of the page (step S10).

The structure analyzing unit 13 determines whether the PDL command is necessary for generating the analysis data table (step S20). A PDL command that is necessary for generating the analysis data table is at least one of a PDL command indicating the start of one page data item and a PDL command indicating the end of one page data item. When the PDL command indicating the start is known, the PDL command immediately before such a PDL command is a PDL command indicating the end. When the PDL command indicating the end is known, the PDL command immediately after such a PDL command is a PDL command indicating the start. However, by focusing on both a PDL command indicating the start and a PDL command indicating the end, the break between pages can be determined accurately.

When the determination of step S20 is YES, the structure analyzing unit 13 registers the start offset and the data size of the page data, in the analysis data table (step S30). That is, the data from a PDL command indicating the start of the page data to a PDL command indicating the end of the page data is determined to be the data size of one page data item. These data sizes are sequentially added up in the order of the pages to obtain the data start offset of the next page.

Next, the specific drawing information extracting unit 14 determines whether the PDL command acquired in step S10 is a PDL command for which the specific drawing information is to be extracted (step S40). That is, the specific drawing information extracting unit 14 determines whether the acquired PDL command is a PDL command necessary for drawing the preview requested page, or a PDL command that affects the drawing of pages after the page in which the PDL command is described. This PDL command is specifically the PDL command described by referring to table 2; and this PDL command is registered in advance in the specific drawing information extracting unit 14 as a known PDL command.

When the determination of step S40 is YES, the specific drawing information extracting unit 14 stores the specific drawing information in the specific drawing information DB 1001 (step S50). Specifically, the specific drawing information extracting unit 14 stores the command information in the specific drawing information DB 1001 and also increments the number of commands (number of accumulated commands) by one. Furthermore, the value registered as the size in the command information is added to the information data size. Accordingly, the accumulated number of commands and the information data size are increased every time one PDL command is analyzed. Note that the specific drawing information extracting unit 14 sets the type of the command information according to the association between the PDL command and the type stored in advance. In the additional information, the information described by referring to table 2 is set, according to the PDL command. The size is the size of a PDL command from the beginning to the end of one PDL command obtained by analysis based on the grammar of PDL. The data may be the PDL command per se.

Next, the print job accumulating unit 15 stores the PDL command acquired in step S10 in the print job DB 1003 (step S60). The job data size in table 3 increases every time the analysis of one PDL command ends, because the size of the PDL command is added to the job data size. In the print job data, the PDL commands are sequentially accumulated one by one.

By the above processes, the analysis of one PDL command is ended, and the print data analyzing unit 20 similarly performs the analysis of all of the PDL commands in the page. Then, when the analysis of all of the PDL commands in one page is ended, the print data analyzing unit 20 starts analyzing the first PDL command in the next page. By repeating the above, all of the PDL commands in all of the pages can be analyzed.

<Generation of Preview Image>

Figure 9:
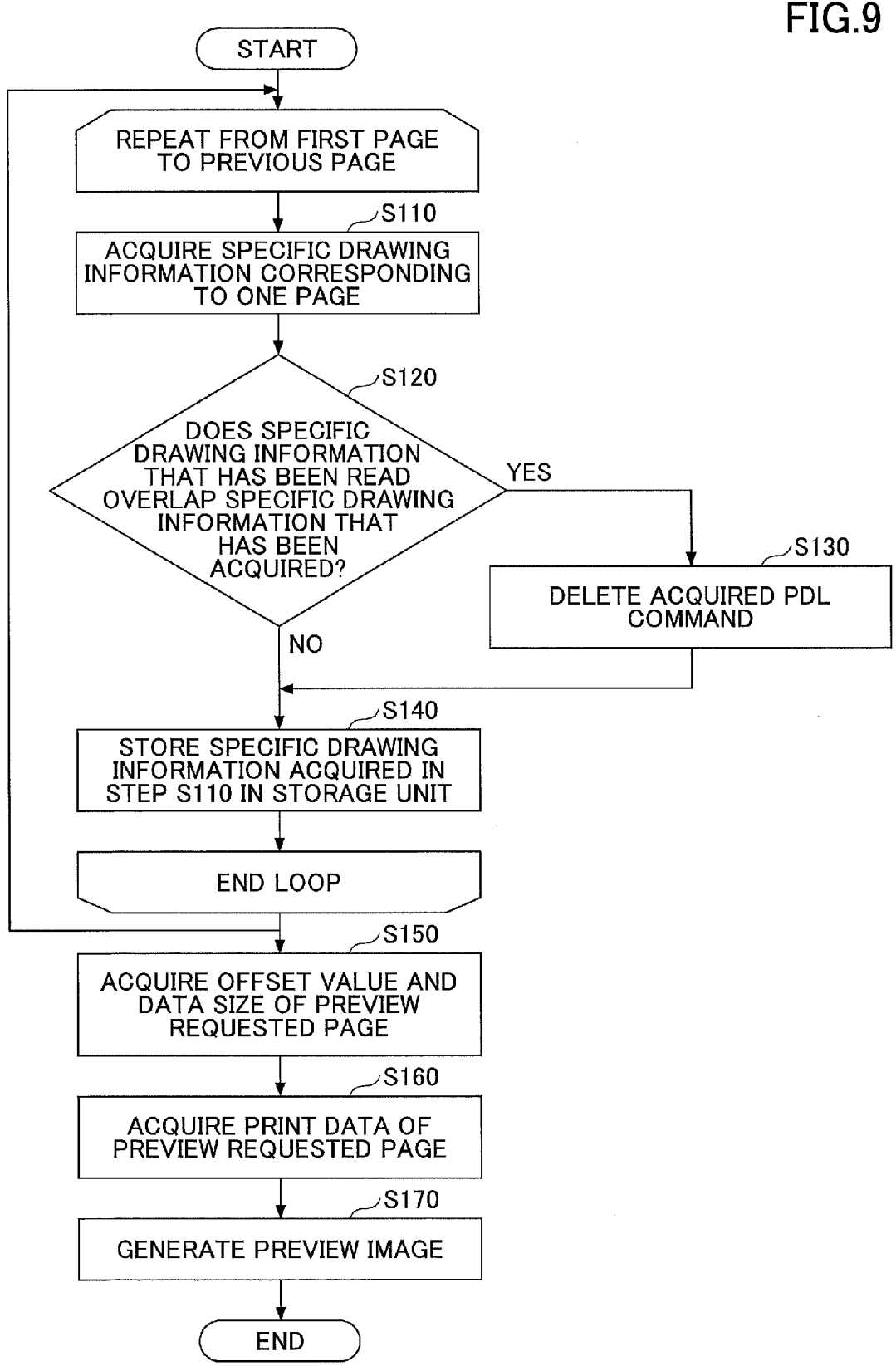
FIG. 9 is an example of a flowchart indicating procedures for generating a preview image by the print management server according to an embodiment of the present invention.

FIG. 9 is an example of a flowchart indicating procedures for generating a preview image by the print management server 10. The process of FIG. 9 starts, for example, as the print management server 10 receives a request to display a preview image from the client 30. First, the preview managing unit 18 performs a process of acquiring specific drawing information corresponding to one page, in the order of pages from the first page to the page before the preview requested page, from the specific drawing information DB 1001.

The preview managing unit 18 acquires specific drawing information corresponding to one page from the specific drawing information DB 1001 (step S110). At this time, the preview managing unit 18 acquires only the PDL command used for generating a preview image from the specific drawing information DB 1001. First, the preview managing unit 18 determines not to acquire a PDL command indicating the start of a page and a PDL command indicating the end of a page, among the types (types of PDL command s) in the command information in the specific drawing information DB 1001. Furthermore, as described by referring to table 2, the preview managing unit 18 refers to the additional information in each PDL command, and acquires only the PDL commands that need to be acquired. Accordingly, the compression on the resources in the RAM 502, etc., can be reduced, and the speed of the process of displaying the preview image can be increased.

The preview managing unit 18 determines whether there are overlapping PDL commands in the specific drawing information acquired from the specific drawing information DB 1001 and the specific drawing information that has already been acquired for pages up to the previous page (step S120). That is, the preview managing unit 18 determines whether there are PDL commands of the same type in the specific drawing information of the focused page and the specific drawing information of pages up to the previous page. The specific drawing information is a PDL command that affects the preview image of the preview requested page; however, the specific drawing information that is set last is to be prioritized, and therefore the above determination is made. Thus, the preview managing unit 18 determines whether there are overlapping PDL commands, with respect to a PDL command for instructing the print area, a PDL command for instructing the orientation of the image data according to the rotation information, a PDL command for defining the font, a PDL command for controlling the font, a PDL command for defining the form, a PDL command for controlling the form, a PDL command for defining brush, and a PDL command for controlling brush.

When the determination of step S120 is YES, the preview managing unit 18 deletes the PDL command that has been acquired (step S130). The PDL command that has been acquired is the PDL command that is accumulated in step S140.

The preview managing unit 18 stores the specific drawing information acquired in step S110, in the storage unit 1000 (step S140). Accordingly, among the overlapping PDL commands in the present page and pages before the present page, the PDL command that is closest to the preview requested page can be enabled. Furthermore, the PDL command that is newly read in the present page can also be stored (can also be enabled).

The process of steps S110 through S140 described above are performed up to the page before the preview requested page.

Next, the preview managing unit 18 acquires the offset value and the data size of the preview requested page from the job analysis data DB 1002 (step S150).

The preview managing unit 18 acquires the print data of the preview managing unit 18 from the print job DB 1003 according to the offset value and the data size of the preview requested page (step S160).

Next, the preview image generating unit 17 generates a preview image of the preview requested page to which the specific drawing information, which is finally stored in the storage unit 1000 in step S140, is applied (step S170). Specifically, among the PDL commands finally stored in the storage unit 1000 in step S140, when there is a PDL command of the same type as a PDL command in the print data of the preview requested page, the PDL command included in the print data of the preview requested page is prioritized in generating the preview image. Furthermore, among the PDL commands finally stored in the storage unit 1000, the PDL commands, which are not included in the print data of the preview requested page, are applied to the preview requested page in generating the preview image.

Accordingly, the specific drawing information set in pages before the preview requested page can be applied to the preview requested page to generate the preview image.

By the above procedures, the specific drawing information, which is included in page data items before the preview requested page and which affects the preview image of the preview requested page, can be applied to the preview requested page. The specific drawing information affecting the preview image of the preview requested page is stored when the print data is acquired, and therefore the preview image can be drawn at high speed. The PDL commands to be read from the specific drawing information DB 1001 can be minimized, according to the type and the additional information in the command information, and therefore the time required for generating a preview image can be reduced. Furthermore, the offset value and the data size of the preview requested page are stored at the time of acquiring the print data, and therefore the page data of the preview requested page can be accessed at high speed. Therefore, a preview image can be generated within a shorter time compared to the method of generating a preview image by analyzing all of the PDL commands starting from the beginning of the print data. This effect is increased as the number of pages increases.

Modified Example 1

In the above description, table 1 indicates a job analysis data table, table 2 indicates a specific drawing information table, and table 3 indicates print job table. However, the job analysis data table, the specific drawing information table, and the print job table can be indicated in a single table.

TABLE 4

| | | | | NUMBER OF PRINT JOBS SPECIFIC DRAWING INFORMATION START POSITION JOB ANALYSIS DATA START POSITION PRINT JOB START POSITION |   |   |   |
|---|---|---|---|---|---|---|---|
| | | SIZE | | INFORMATION DATA SIZE | | | |
| SPECIFIC DRAWING INFORMATION TABLE | FIRST JOB | NUMBER OF COMMANDS | | NUMBER OF ACCUMULATED COMMANDS | | | |
| | | COMMAND INFORMATION (FIRST COMMAND) | TYPE | ADDITIONAL INFORMATION 1 | ADDITIONAL INFORMATION 2 SIZE DATA | ... | ADDITIONAL INFORMATION k |
| | | : | | | : | | |
| | | COMMAND INFORMATION (nTH COMMAND) | TYPE | ADDITIONAL INFORMATION 1 | ADDITIONAL INFORMATION 2 SIZE DATA | ... | ADDITIONAL INFORMATION k |
| | : | : | | | : | | |
| | nTH JOB | SIZE NUMBER OF COMMANDS | | INFORMATION DATA SIZE NUMBER OF ACCUMULATED COMMANDS | | | |
| | | COMMAND INFORMATION (FIRST COMMAND) | TYPE | ADDITIONAL INFORMATION 1 | ADDITIONAL INFORMATION 2 SIZE DATA | ... | ADDITIONAL INFORMATION k |
| | | : | | | : | | |
| | | COMMAND INFORMATION (nTH COMMAND) | TYPE | ADDITIONAL INFORMATION 1 | ADDITIONAL INFORMATION 2 SIZE DATA | ... | ADDITIONAL INFORMATION k |
| JOB ANALYSIS DATA TABLE | FIRST JOB INFORMATION | | | INFORMATION DATA SIZE JOB NAME DATA START OFFSET OF FIRST PAGE DATA SIZE OF FIRST PAGE : DATA START OFFSET OF nTH PAGE DATA SIZE OF nTH PAGE : NUMBER OF PAGES | | | |
| | : | | | : | | | |
| | nTH JOB INFORMATION | | | INFORMATION DATA SIZE JOB NAME DATA START OFFSET OF FIRST PAGE DATA SIZE OF FIRST PAGE : DATA START OFFSET OF nTH PAGE DATA SIZE OF nTH PAGE : NUMBER OF PAGES | | | |
| PRINT JOB TABLE | FIRST JOB INFORMATION | | | JOB DATA SIZE PRINT JOB DATA | | | |
| | : | | | : | | | |
| | nTH JOB INFORMATION | | | JOB DATA SIZE PRINT JOB DATA | | | |

Table 4 indicates a combination table in which the job analysis data table, the specific drawing information table, and the print job table are combined. The contents of the job analysis data table, the specific drawing information table, and the print job table are the same as the contents of tables 1 through 3, and therefore the different points are described. The combination table of table 4 includes the respective start positions of the specific drawing information table, the job analysis data table, and the print job table. Accordingly, the print management server 10 can identify the start position of each table, and therefore even when the combination table of table 4 is stored in the storage unit 1000, the print management server 10 is able to access each of the tables.

Modified Example 2

In FIG. 3, etc., the print management server 10 for generating a preview image and the client 30 for displaying a preview image are separate devices. However, the print management server 10 can display the preview image on the display device 507 included in the print management server 10. In this case, the print management server 10 directly accepts the print job and the preview requested page, generates a preview image, and displays the preview image on the display device 507.

Other Application Examples

The information processing apparatus and the image processing system are not limited to the specific embodiments described in the detailed description, and variations and modifications may be made without departing from the spirit and scope of the present invention.

For example, in FIG. 3, etc., the work host 50 and the client 30 are separate devices. However, the work host 50 and the client 30 may be integrated in a single body. That is, the device that sends the print data may request the display of the preview image. Furthermore, the print management server 10 and the printer 60 may be integrated in a single body. In this case, the printer 60 sends a preview image to the client 30, and displays the preview image.

Furthermore, in the above embodiment, a preview image requested for one page at a time; however, the client may request preview images for a plurality of pages at a time.

Furthermore, the configuration example of FIG. 5, etc., indicated in the above embodiment is divided according to the main functions to facilitate the understanding of processes by the print management server 10. The present invention is not limited by how the process units are divided or the names of the process units. The processes of the print management server 10 may be further divided into many process units according to the process contents. Furthermore, the process units may be divided such that a single process unit further includes many processes.

Furthermore, for example, the specific drawing information DB 1001, the job analysis data DB 1002, and the print job DB 1003 that are stored in the storage unit 1000, may be included in the print management server 10, and may also be present in a network.

Note that the print management server 10 is an example of an information processing apparatus, the print data acquiring unit 12 is an example of a print data acquirer, the server managing unit 16 is an example of a request acceptor, the specific drawing information DB 1001 is an example of a drawing information storage, the preview managing unit 18 is an example of a reader, and the preview image generating unit 17 is an example of a generator. The specific drawing information according to an embodiment of the present invention is an example of preview use drawing information, any PDL command is an example of drawing information, additional information is an example of determination information, the print job database DB 1003 is an example of a print data storage, and the job analysis data DB 1002 is an example of a position information storage. The structure analyzing unit 13 is an example of a structure analyzer, the specific drawing information extracting unit 14 is an example of a drawing information saver, the client 30 is an example of a terminal, the print management system 100 is an example of an image processing system, and the display control unit 33 is an example of a displayer.

According to one embodiment of the present invention, an information processing apparatus, which is capable of reducing the time taken until image data of a requested page is displayed, can be provided.

What is claimed is:

1. An information processing apparatus for generating image data for a preview image by using print data described in a page description language, the information processing apparatus comprising:
    a hardware processor; and
    a hardware memory containing instructions, which when executed, cause the hardware processor to:
        acquire the print data described in the page description language from outside of the information processing apparatus;
        extract specific drawing information from the print data described in the page description language, and store the specific drawing information in a specific drawing information storage; the specific drawing information including multiple page description language commands necessary for generating a preview image of a specified page of the print data;
        accept a request to display the image data of the specified page of the print data;
        read, for each page in the print data up to a page before the specified page, specific drawing information corresponding to one page, from among the specific drawing information stored in the specific drawing information storage; and
        generate the image data of the specified page based on the read specific drawing information.

2. The information processing apparatus according to claim 1, wherein the instructions, when executed, cause the hardware processor to:
    read the specific drawing information for each page in an order of the pages in the print data, and
    perform an enabling process on each of the pages in the print data up to the page before the specified page, the enabling process including deleting the specific drawing information of the pages before a presently read page to enable the specific drawing information of the presently read page to be used in generating the preview image, when the pages before the presently read page include the specific drawing information of a same type as the specific drawing information included in the presently read page.

3. The information processing apparatus according to claim 1, wherein the instructions, when executed, cause the hardware processor to:
    store drawing information other than the specific drawing information, in association with a type of the drawing information, and
    read only the drawing information of a type defined in advance from the specific drawing information storage.

4. The information processing apparatus according to claim 1, wherein the instructions, when executed, cause the hardware processor to:
store determination information for determining whether each page description language command among the multiple page description language commands included in the specific drawing information needs to be read, and
read only the page description language commands that were determined as needing to be read based on the determination information, from the specific drawing information storage.

5. The information processing apparatus according to claim 1, wherein the instructions, when executed, cause the hardware processor to:
refer to a position information storage storing position information of each of the pages in the print data and a data size of each of the pages in the print data, within a print data storage storing the print data, and
read the print data of the specified page from the print data storage.

6. The information processing apparatus according to claim 5, wherein the instructions, when executed, cause the hardware processor to:
identify the print data denoting at least one of a start of a page and an end of a page, from the acquired print data, and
generate the position information of each of the pages in the print data obtained by adding the data size of each page from the start to the end of each page, to the data size of the pages up to a previous page, and store the position information in the position information storage.

7. The information processing apparatus according to claim 6, wherein the instructions, when executed, cause the hardware processor to:
extract the drawing information denoting at least one of a start of a page and an end of a page and the drawing information defined in advance as the specific drawing information, from the acquired print data acquired, and store the extracted drawing information in the specific drawing information storage as the specific drawing information.

8. The information processing apparatus according to claim 7, wherein the instructions, when executed, cause the hardware processor to:
send, before finishing storage of the specific drawing information for all of the pages, a number of the pages in the print data for which specific drawing information has been stored in the specific drawing information storage, to a terminal connected via a network.

9. A non-transitory computer-readable recording medium storing a program that causes a computer to execute a process performed in an information processing apparatus for generating image data for a preview image by using print data described in a page description language, the process comprising:
acquiring the print data described in the page description language from outside of the information processing apparatus;
extracting specific drawing information from the print data described in the page description language, and store the specific drawing information in a specific drawing information storage; the specific drawing information including multiple page description language commands necessary for generating a preview image of a specified page of the print data;
accepting a request to display the image data of the specified page of the print data;
reading, for each page in the print data up to a page before the specified page, specific drawing information corresponding to one page, from among the specific drawing information stored in the specific drawing information storage; and
generating the image data of the specified page based on the read specific drawing information.

10. An image processing system for generating image data for a preview image by using print data described in a page description language, the image processing system comprising:
a hardware processor; and
a hardware memory containing instructions, which when executed, cause the hardware processor to:
acquire the print data described in the page description language from outside of the information processing apparatus;
extract specific drawing information from the print data described in the page description language, and store the specific drawing information in a specific drawing information storage; the specific drawing information including multiple page description language commands necessary for generating a preview image of a specified page of the print data;
accept a request to display the image data of the specified page of the print data;
read, for each page in the print data up to a page before the specified page, specific drawing information corresponding to one page, from among the specific drawing information stored in the specific drawing information storage;
generate the image data of the specified page by applying based on the specific drawing information; and
a second hardware processor;
a hardware memory containing instructions, which when executed, cause the second hardware processor to:
display the image data on a display device.

* * * * *